US007128008B2

(12) United States Patent
Lothe

(10) Patent No.: US 7,128,008 B2
(45) Date of Patent: Oct. 31, 2006

(54) DEVICE FOR AND A METHOD OF FIXING AND LIFTING VERTICALLY INSTALLED CARGO PRESSURE TANKS IN SHIPS

(75) Inventor: Per Lothe, Førresfjorden (NO)

(73) Assignee: Knutsen OAS Shipping AS (NO)

( * ) Notice: Subject to any disclaimer, the term of this patent is extended or adjusted under 35 U.S.C. 154(b) by 8 days.

(21) Appl. No.: 10/520,453

(22) PCT Filed: Jun. 27, 2003

(86) PCT No.: PCT/NO03/00217

§ 371 (c)(1),
(2), (4) Date: Jan. 5, 2005

(87) PCT Pub. No.: WO2004/005793

PCT Pub. Date: Jan. 15, 2004

(65) Prior Publication Data

US 2005/0257728 A1 Nov. 24, 2005

(30) Foreign Application Priority Data

Jul. 9, 2002 (NO) ................................ 20023303

(51) Int. Cl.
*B63B 25/08* (2006.01)
*F16L 3/00* (2006.01)
*B65D 19/00* (2006.01)

(52) U.S. Cl. ...................... 114/74 A; 137/376; 206/597

(58) Field of Classification Search ............... 114/74 A
See application file for complete search history.

(56) References Cited

U.S. PATENT DOCUMENTS

| | | | | |
|---|---|---|---|---|
| 2,537,085 | A * | 1/1951 | Phelps | 114/74 A |
| 3,270,700 | A * | 9/1966 | Kohn et al. | 114/74 A |
| 4,481,972 | A | 11/1984 | Stavlo | |
| 4,564,109 | A | 1/1986 | Stavlo | |
| 4,967,934 | A | 11/1990 | Andonian | |
| 6,439,632 | B1 | 8/2002 | Webber | |

FOREIGN PATENT DOCUMENTS

| | | |
|---|---|---|
| FR | 2 536 373 | 5/1984 |
| WO | WO 02/066316 | 8/2002 |
| WO | WO 03/016777 | 2/2003 |
| WO | WO 03/047959 | 6/2003 |

* cited by examiner

*Primary Examiner*—Jesús D. Sotelo
(74) *Attorney, Agent, or Firm*—Andrus, Sceales, Starke & Sawall, LLP

(57) ABSTRACT

A device for and method of fixing vertically installed cargo pressure tanks (2), particularly the type used for sea transport of pressurised petroleum products, wherein at least two cargo pressure tanks (2) constitute a liftable cassette (1), the tanks (2) of which preferably are placed in the upright position on a cassette lifting frame (4) and are interconnected by means of a guide frame (6).

5 Claims, 5 Drawing Sheets

DEVICE FOR AND A METHOD OF FIXING AND LIFTING VERTICALLY INSTALLED CARGO PRESSURE TANKS IN SHIPS

CROSS REFERENCE TO RELATED APPLICATION

The present application is the U.S. national stage application of International Application PCT/NO2003/000217, filed Jun. 27, 2003, which international application was published on Jan. 15, 2004 as International Publication WO 2004/005793. The International Application claims priority of Norwegian Patent Application 20023303, filed Jul. 9, 2002.

BACKGROUND OF THE INVENTION

This invention regards a device for and a method of fixing and lifting vertically installed pressure tanks in ships. In particular, it regards vertically installed pressure tanks, in which two or more pressure tanks are arranged in a cassette, and in which the cassette is arranged to be lifted out of and into the ship's cargo hold.

Sea transport of gaseous petroleum products essentially has taken place by means of the so-called Liquefied Natural Gas (LNG) method. The method comprises cooling of gas to a liquid state, whereupon the gas may be transported in ship tanks at atmospheric pressure. The method requires costly equipment both at the shipment and receiving locations. As the gas must be cooled to a relatively low temperature, up to a fifth of the gas is used to operate the cooling and heating processes. Consuming this amount of energy solely in transport-related processes is expensive and also environmentally questionable.

Several other ship-based solutions have been proposed, in which the gas is pressurised and/or cooled in order to achieve a gas density that is practical for the purpose. Such solutions have gained little practical use, but a solution in which a large number of vertical tubular pressure tanks are placed in the cargo hold of a ship, has attracted considerable attention. The method is termed PNG—Pressurised Natural Gas. According to such a method, the gas is compressed at the shipment location to an overpressure of a couple of hundred bars, and the gas then is filled onto the pressure tanks located on the ship. The cooling is limited to a simple and inexpensive removal of the gas compression heat, so as to leave the transport temperature near ambient temperature.

By installing relatively long cargo pressure tanks vertically in cassettes, it is possible to better exploit the material properties of the cargo pressure tanks, whereby the net weight of the cargo pressure tanks relative to the loading capacity of the ship may be reduced.

SUMMARY OF THE INVENTION

The object of the invention is to provide a device and a method for rational placing and connecting of the cassettes to the ship's cargo hold, and also to overcome weight-related constraints on the cassette construction with regard to lifting and secure fixing in the ship's cargo hold.

The object is achieved in accordance with the inventive features provided in the specification below and in the subsequent patent claims.

A number of cargo pressure tanks are placed on a cassette lifting frame prior to being lifted into the ship's cargo hold. A guide frame is moved into the cargo pressure tanks to a position at the midsection of the cargo pressure tanks. The cargo pressure tanks, the cassette lifting frame and the guide frame constitute a cassette. The guide frame is arranged to mutually connect the cargo pressure tanks of the cassettes and to form a support member between the cassette and the ship's structure.

In the area between the cargo pressure tanks, the guide frame is provided with a through opening, through which a lifting yoke may be moved down to the cassette lifting frame. The lifting yoke is equipped with a locking device arranged to releasably engage the cassette lifting frame., By means of a crane, the lifting yoke thus may be used to lift the cassette into or out of the ship's cargo hold.

The guide frame abutment face against the ship's structure may consist of a tapering portion that corresponds to a similar fixing section in the ship's cargo hold.

When the cassette is to be lifted into the cargo hold, the guide frame is placed in a position along the cargo pressure tanks causing the guide frame to bear against its corresponding fixing section during the lowering of the cassette into the cargo hold, and before the cassette lifting frame is disposed on the floor of the cargo hold. During the last stage of the lowering of the cassette into the cargo hold, the guide frame is moved along the cargo pressure tanks until the cassette lifting frame is placed onto the floor.

Thus the cassette is positioned correctly and connected to the ship's structure, inasmuch as it is placed on the floor of the cargo hold. If required, more than one guide frame may be used for every cassette.

Then the lifting yoke is released from the cassette lifting frame and removed from the cassette.

The device and the method contribute to overcome the greatest disadvantage of the PNG-method, which involves the net weight of the cargo pressure tanks and the weight of the required fixing structure taking up too much of the loading capacity of the ship.

The cassettes are arranged for prefabrication, checking and certification before being positioned in the ship.

Preferably, the cargo pressure tanks of the cassette are connected to a joint manifold. As insignificant temperature difference and associated expansion may exist between the interconnected pressure tanks of the present structure, the manifold may be of a simple design.

BRIEF DESCRIPTION OF THE DRAWINGS

A non-limiting example of a preferred embodiment is described in the following and is illustrated in the accompanying drawings, in which.

DETAILED DESCRIPTION OF THE INVENTION

Figure 1:
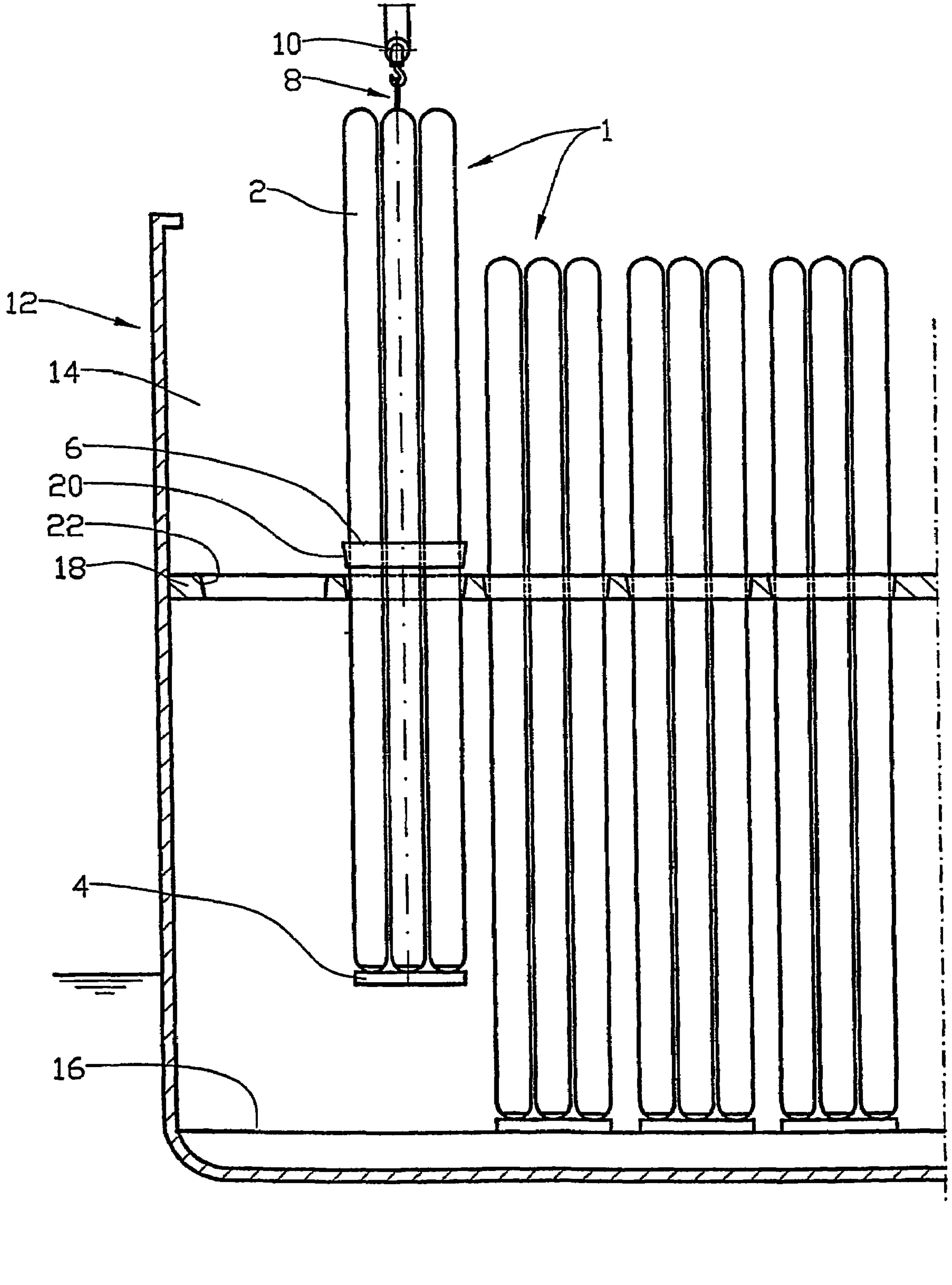
FIG. 1 shows a cassette while being lowered into a cargo hold and just before the cassette guide frame bears against the fixing section of the ship, the remaining cassettes being placed in their transport positions in the ship's cargo hold.

In the drawings, reference number 1 denotes a cassette comprising cargo pressure tanks 2, a cassette lifting frame 4 and a guide frame 6.

The cassette is arranged for liftinged into the cargo hold 14 of a ship 12 by means of a lifting yoke 8 and a crane 10.

The cargo hold 14 is constructed so as to allow a relatively large number of cassettes 1 to be placed in an upright position on the floor 16 of the cargo hold 14. At a level higher than the floor 16, the cargo hold 14 is provided with a fixing section 18 connected to the remaining structure of the ship 12 and arranged to take up horizontal forces from the cassettes 1.

Figure 2:
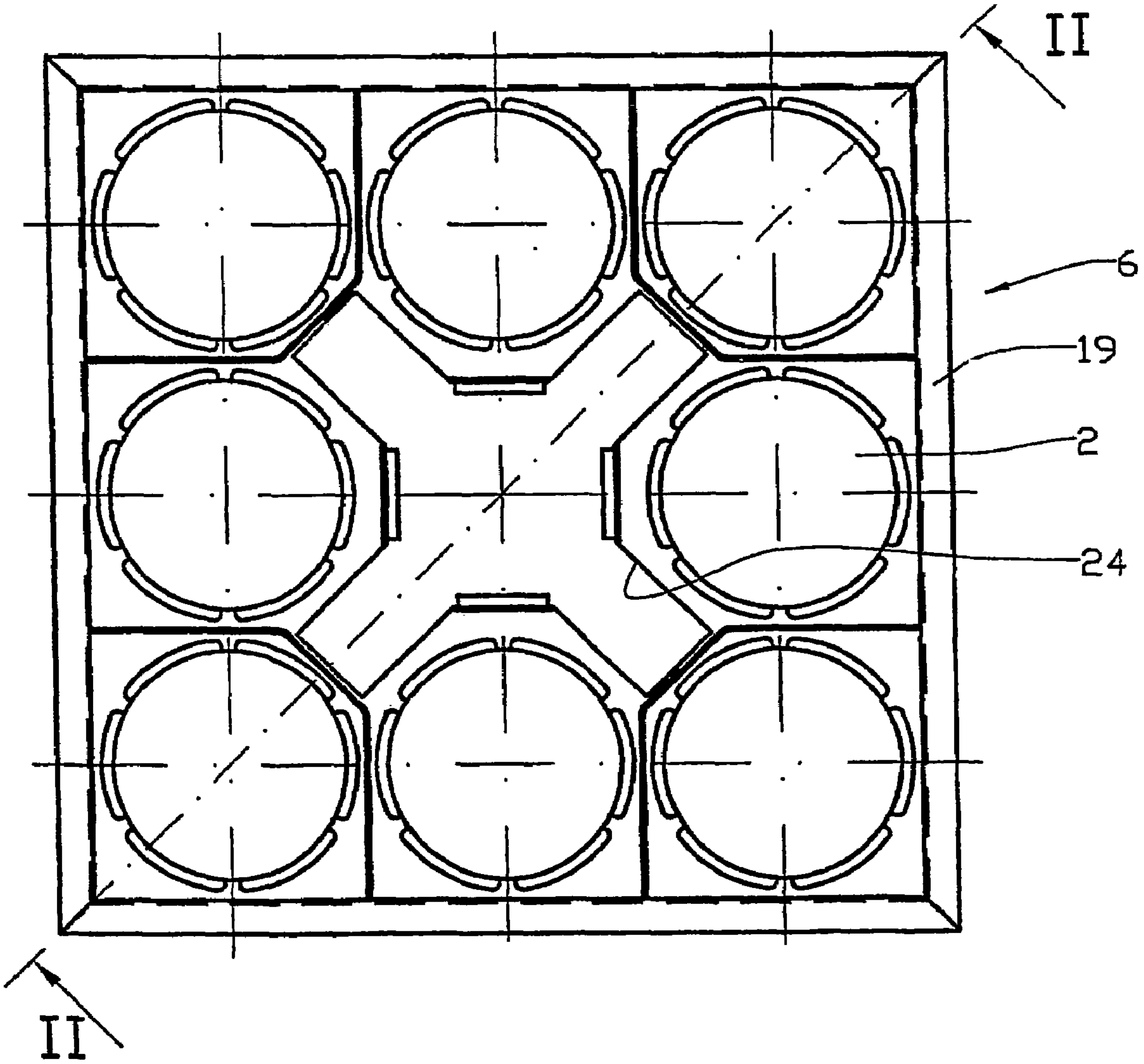
FIG. 2 is a plan view of the cassette.
Figure 3:
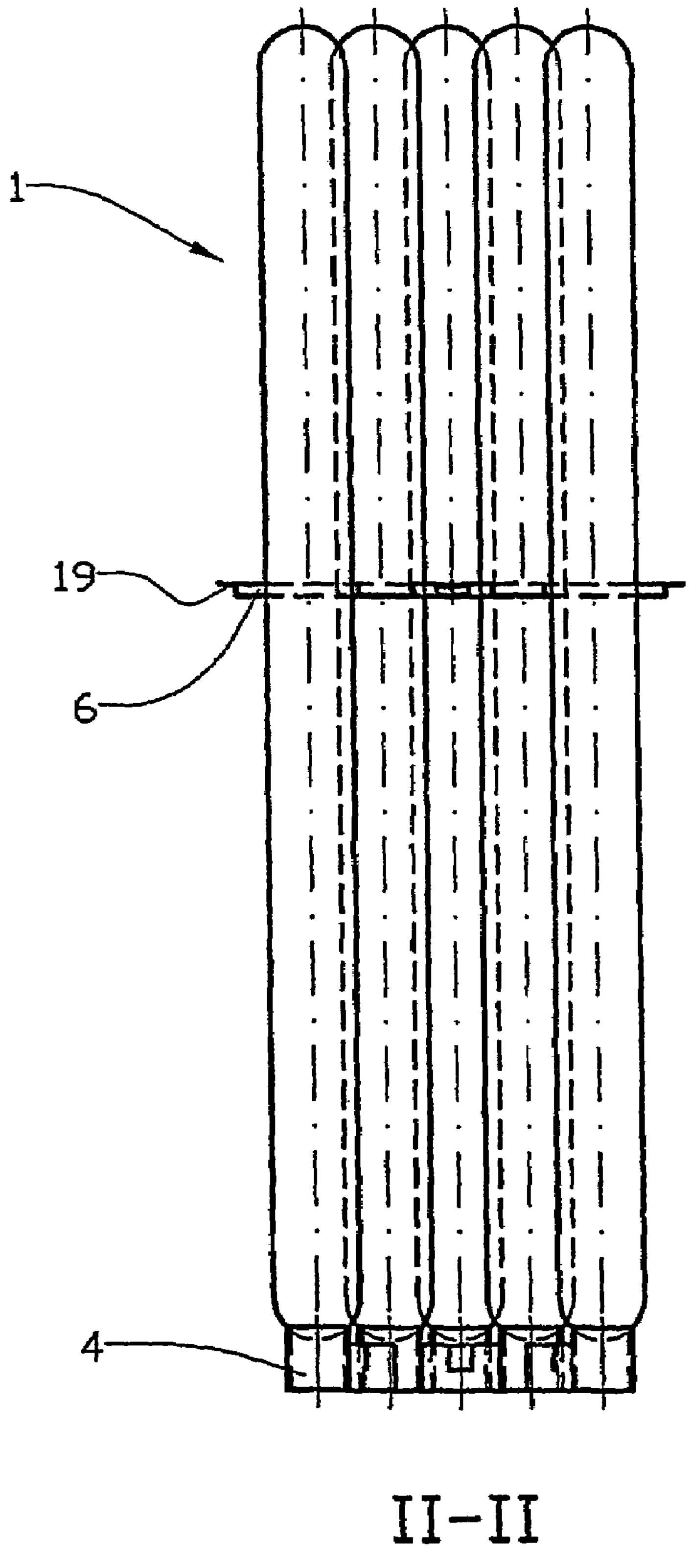
FIG. 3 shows a section II—II of FIG. 2.

The guide frame 6 encloses the cargo pressure tanks 2, as shown in FIG. 2, and is provided with a shoulder 19 or a inwardly sloping contact surface 20, see FIG. 1. The shoulder 19 or contact surface 20 correspond with equivalent surfaces 22 in the fixing section 18 of the ship 12. In the portion between the cargo pressure tanks 2, the guide frame 6 is provided with a through opening 24, through which the lifting yoke 8 may be moved.

The guide frame 6 is pre-tensioned and moveably connected to the cargo pressure tanks 2 in a manner not allowing its net weight to move it along the cargo pressure tanks 2.

The cassette lifting frame 4 is provided with appropriate abutment faces 25 for the cargo pressure tanks 2 and lifting brackets 26 in mating engagement with hooks 28 of the lifting yoke 8.

The hooks 28 of the lifting yoke 8 are pivotally connected to a lifting stay 30 of the lifting yoke 8 via pivot joints 32. A hydraulic cylinder 34, preferably remotely operated, is placed within, and one end portion thereof connected to, a housing 35 connected to the lower portion of the lifting stay 30. At its opposite portion, the piston rod of the hydraulic cylinder 34 is pivotally connected to the lower part of the hooks 28 via toggle joints 36.

When a cassette 1 is to be placed in the cargo hold 14 of a ship 12, a suitable number of cargo pressure tanks 2 are placed in an upright position on the cassette lifting frame 4, whereupon the guide frame 6 is moved along the cargo pressure tanks 2 until it is located at a suitable position at the midsection of the cargo pressure tanks 2.

Figure 4:
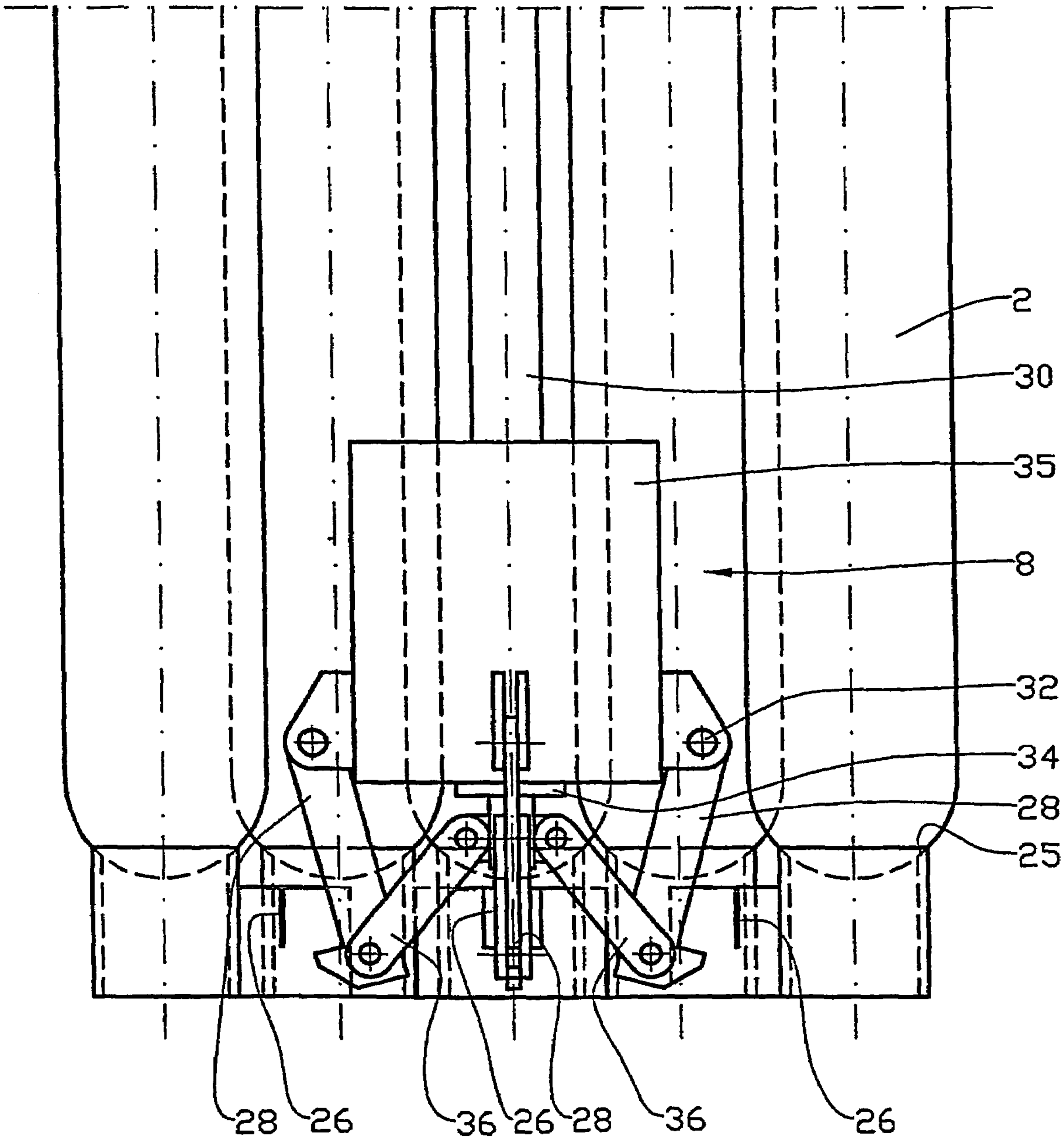
FIG. 4 shows, in larger scale, a section of the cassette lifting frame, in which the lifting yoke has been positioned in the cassette lifting frame and is ready for connection to the cassette lifting frame.

The lifting yoke 8 is lowered between the vertical cargo pressure tanks 2 and onwards through the through opening 24 of the guide frame 6, the hydraulic cylinder 34 being in its turned-in position. The hooks 28 are in their retracted, inactive position, see FIG. 4. In this inactive position, the hooks 28 may be moved past the lifting brackets 26 of the cassette lifting frame 4.

Figure 5:
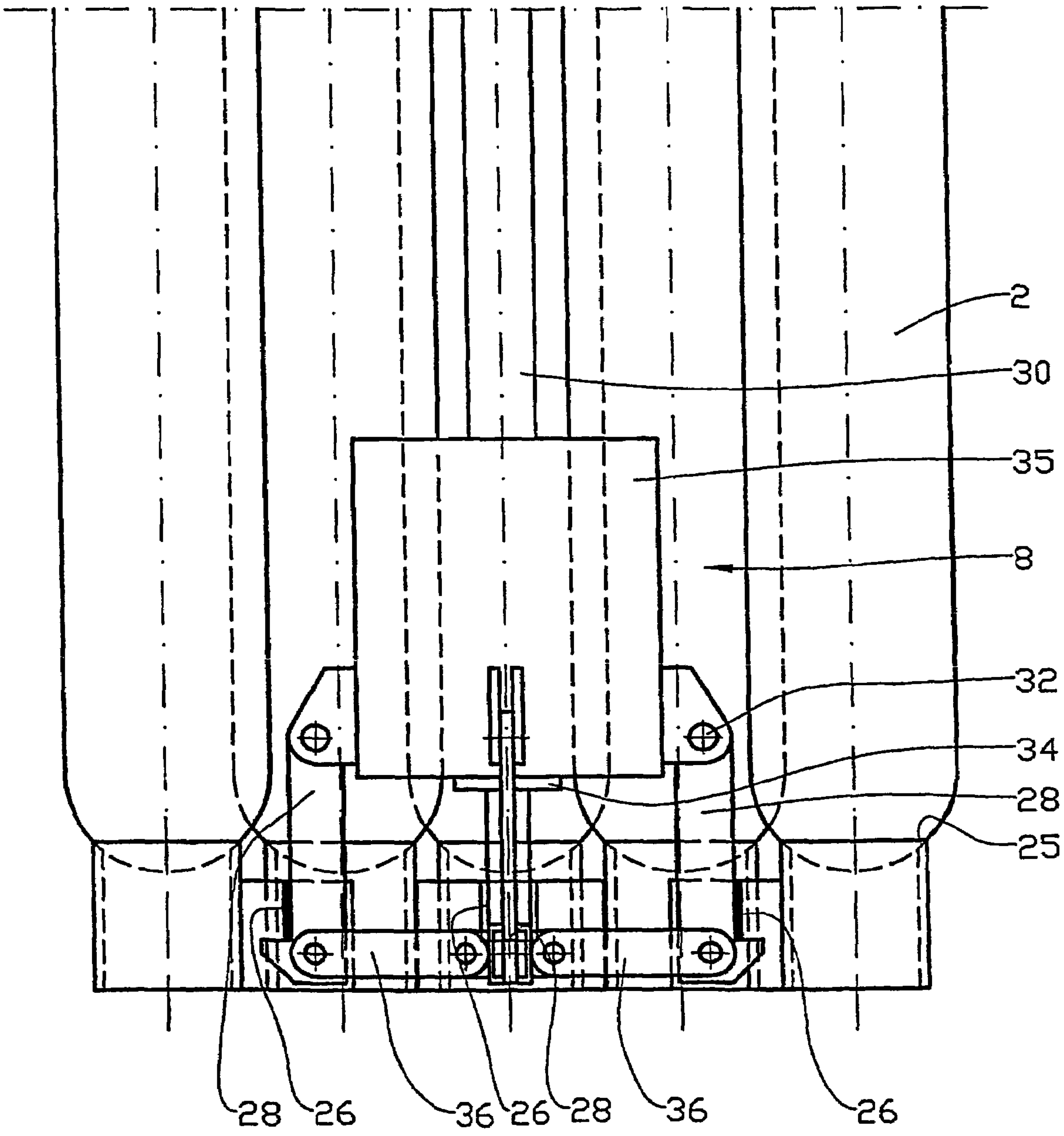
FIG. 5 shows the same as FIG. 4, but here the lifting yoke is lockingly engaging the cassette lifting frame.

Then the hydraulic cylinder 34 is guided onto its extended position, whereby the hooks 28, by means of the toggle joints 36, are rotated about their respective pivot joints 32 to their turned-out, active position, see FIG. 5.

When the lifting yoke 8 then is moved upwards, the hooks 28 bear against the lifting brackets 26. The cassette 1 is lifted and then may be lowered into the ship's cargo hold.

During the lowering of the cassette 1 into the cargo hold 14, the exterior side faces 20 of the guide frame 6 bear against the corresponding surfaces 22 of the fixing section 18, whereby the cassette 1 is guided into the correct position relative to the fixing section 18. During the last lowering phase, the cargo pressure tanks 2 are moved down through the guide frame 6 until the cassette lifting frame 4 bears against the floor 16 of the cargo hold 14.

Thereby the cassette stands on the floor 16 and is fixed horizontally by the fixing section 18 via the guide frame 6 and any guides (not shown) connected to the floor 16.

The lifting yoke 8 is lowered further in order to relieve the hooks 28. The hydraulic cylinder 34 is operated so as to rotate the hooks 28 to their turned-in, inactive positions, whereupon the lifting yoke 8 may be lifted out of the cassette 1. Similarly, the cassette 1 may be lifted out of the ship for inspection, for example.

The hooks 28 may be formed with barbs (not shown) to prevent them from being pulled out of their engagements with the lifting brackets 26, even if the hydraulic cylinder 34 mistakenly is operated during the lifting operation when the cassette lifting frame 2 is placed in the lifting yoke 8.

If desirable, both the guide frame 6 and the cassette lifting frame 4 may be connected further to the ship's 12 structure.

Use of cassettes 1 according to the invention considerably simplifies, relative to the prior art, manufacturing, inspection and assembly of the present type of pressure tanks 2 of a ship 12.

The invention claimed is:

1. A device for fixing elongated cargo pressure tanks (2), in particular tanks for pressurized petroleum products, in a cargo hold (14) of a ship (12), the ship having a fixing structure (18) in the cargo hold, said device comprising:

a cassette lifting frame for receiving at least two cargo pressure tanks (2) in an upright position and releasably affixing the tanks on said cassette lifting frame to form an integral, liftable cassette (1); and a guide frame (6) for interconnecting the cargo pressure tanks of a cassette, said guide frame being movable along the elongated cargo pressure tanks (2) and being arranged to take up horizontal forces from the cargo pressure tanks (2) through abutment against the fixing structure (18) when the cargo pressure tanks are in the cargo hold (14) of the ship (12).

2. A device in accordance with claim 1 characterized in that said guide frame (6) has at least one contact surface (19, 20) bearing against a corresponding contact surface (22) of the fixing structure (18), said contact surface (19, 20) of said guide frame slanting relative to a longitudinal axis of the cassette (1).

3. A device in accordance with claim 1 characterized in that the cassette lifting frame (4) is provided with lifting brackets (26) that are in mating engagement with hooks (28) of a lifting yoke (8), the hooks (28) being connected to an actuator (34), the actuator (34) being arranged so as to allow it to move the hooks (28) between a locking and a non-locking position.

4. A device in accordance with claim 3, characterized in that the hooks (28) are formed so as to prevent them from being pulled out of their engagements with the lifting brackets (26) when the cassette lifting frame (4) is placed in the lifting yoke, even if the hydraulic cylinder (34) mistakenly is operated during a lifting operation.

5. A method of loading a cassette (1) of elongated cargo pressure tanks into a cargo hold (14) of a ship (12), characterized in that, during a step of lowering of the cassette (1) into the cargo hold (14), a guide frame (6) for the cassette (1) bears against a fixing structure (18) in the cargo hold (14) before a cassette lifting frame (4) bears against a floor (16) of the cargo hold.

* * * * *